(12) United States Patent
Jiang et al.

(10) Patent No.: US 12,063,634 B2
(45) Date of Patent: Aug. 13, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 505 days.

(21) Appl. No.: 17/523,943

(22) Filed: Nov. 11, 2021

(65) Prior Publication Data

US 2022/0078791 A1 Mar. 10, 2022

Related U.S. Application Data

(63) Continuation of application No. PCT/CN2020/094145, filed on Jun. 3, 2020.

(30) Foreign Application Priority Data

Jun. 25, 2019 (CN) .......................... 201910555749.5

(51) Int. Cl.
*H04W 72/0446* (2023.01)
*H04W 4/40* (2018.01)
(Continued)

(52) U.S. Cl.
CPC ......... *H04W 72/0446* (2013.01); *H04W 4/40* (2018.02); *H04W 56/001* (2013.01); *H04W 72/20* (2023.01)

(58) Field of Classification Search
CPC . H04W 56/001; H04W 4/40; H04W 72/0406; H04W 72/0453; H04W 72/20;
(Continued)

(56) References Cited

U.S. PATENT DOCUMENTS

2018/0152987 A1* 5/2018 Ro ...................... H04L 27/2655

FOREIGN PATENT DOCUMENTS

| CN | 106605433 A | 4/2017 |
|---|---|---|
| CN | 107689839 A | 2/2018 |

(Continued)

OTHER PUBLICATIONS

CN201910555749.5 Notification to Grant Patent Right for Invention dated Aug. 11, 2021.
(Continued)

*Primary Examiner* — Chi H Pham
*Assistant Examiner* — Ji-Hae Yea

(57) ABSTRACT

Method and device used in nodes for wireless communications. A first node firstly determines a first duration set, a first time window and a first time length from a base station side, the first duration set belongs to the first time window, and a timing for each duration in the first time window refers to a receiving timing of the first node; it then transmits a first signal in the first target duration according to the timing for the first target duration, the first target duration being deferred by a first time length is a second reference duration, the second reference duration belonging to a first duration set; the first signal indicates a first index. By sending the first index to a sidelink terminal, the present disclosure can prevent interference between a cellular link and a sidelink in a large-transmission-delay system, thus enhancing the system's overall performance.

20 Claims, 6 Drawing Sheets

(51) Int. Cl.
*H04W 56/00* (2009.01)
*H04W 72/20* (2023.01)

(58) Field of Classification Search
CPC ............. H04W 72/23; H04W 72/0446; H04W 72/231; H04W 72/232; H04W 72/25; H04W 72/27; H04W 72/29; H04L 5/00; H04L 5/0053
See application file for complete search history.

(56) References Cited

FOREIGN PATENT DOCUMENTS

| CN | 108243390 | A | | 7/2018 | | |
|---|---|---|---|---|---|---|
| CN | 108781436 | A | | 11/2018 | | |
| CN | 108886755 | A | | 11/2018 | | |
| CN | 109245869 | A | | 1/2019 | | |
| CN | 109565867 | A | | 4/2019 | | |
| CN | 109618408 | A | * | 4/2019 | ........... | H04L 5/0008 |
| CN | 109618408 | A | | 4/2019 | | |
| CN | 109802816 | A | | 5/2019 | | |
| WO | 2016119241 | A1 | | 8/2016 | | |
| WO | WO-2016119241 | A1 | * | 8/2016 | ........... | H04W 24/02 |
| WO | 2017097640 | A1 | | 6/2017 | | |

OTHER PUBLICATIONS

CN201910555749.5 1st Office Action dated May 26, 2021.
CN201910555749.5 First Search Report dated May 18, 2021.
ISR received in application No. PCT/CN2020/094145 dated Aug. 28, 2020.
Qualcomm Inc. "FeD2D synchronization aspects" 3GPP TSG RAN WGI Meeting #90, RI-1713039, Aug. 25, 2017 (Aug. 25, 2017).

* cited by examiner

METHOD AND DEVICE IN NODES USED FOR WIRELESS COMMUNICATION

CROSS REFERENCE TO RELATED APPLICATIONS

This application is a continuation of International Application No. PCT/CN2020/094145, filed Jun. 3, 2020, claims the priority benefit of Chinese Patent Application No. 201910555749.5, filed on Jun. 25, 2019, the full disclosure of which is incorporated herein by reference.

BACKGROUND

Technical Field

The present disclosure relates to transmission methods and devices in wireless communication systems, and in particular to a method and device for timing synchronization in a system with larger transmission delay.

Related Art

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. The current V2X system supports both the configuration of time-frequency resources by a base station to be used for V2X transmission and determination of time-frequency resources by a V2X transmitting end through sensing measurement to be used for V2X transmission.

And in order to adapt to diverse application scenarios and meet different requests, a study item of Non-Terrestrial Networks (NTN) under NR was also approved by the 3GPP RAN #75 Plenary, starting with the R15 version. Later at the #79 Plenary a decision was made on the study of solutions to issues in NTN and WIs were correspondingly started in R16 and R17 to standardize techniques in this regard.

SUMMARY

The NTN is advantageous in its wide coverage, when combined with V2X technique, the NTN can configure for geographical locations still uncovered by terrestrial base station time-frequency resources for V2X transmissions. Then the time-frequency resources actually used for transmission can be determined in a way based on the present sensing between V2X terminals. Currently in D2D of Rel-12, sidelink synchronization signals, Physical Sidelink Discovery Channel (PSDCH) and Physical Sidelink Control Channel (PSCCH) are all based on DL Timing from the base station to the UE when determining a transmission time. To avoid interferences with a cellular link of the UE and uplink reception of the base station, the transmission of a Physical Sidelink Shared Channel (PSSCH) shall be determined according to UL Timing of Uu interface, and be achieved by indicating a Timing Advance (TA) in sidelink in Sidelink Control Information (SCI). However, when introducing V2X into NTN, due to significant differences in TA among different UEs, which may vary from several to dozens of milliseconds, the conventional practice of Rel-12, namely, a PSCCH is transmitted according to DL timing of Uu interface and a PSSCH is transmitted according to UL timing of Uu interface, if continued, will require a large scheduling delay between the PSCCH and the PSSCH to ensure that the PSSCH won't come before the PSCCH because of TA. Therefore, the above method is apparently irrational.

Targeting the above application scenarios and new requirements, a solution is herein proposed by the present disclosure. It should be noted that the embodiments of a first node and a third node of the present disclosure and the characteristics in the embodiments may be applied to a base station while the embodiments of a second node can be applied to a terminal if no conflict is incurred. In the case of no conflict, the embodiments of the present disclosure and the characteristics in the embodiments may be combined with each other arbitrarily.

The present disclosure provides a method in a first node for wireless communications, comprising:

receiving a first signaling, a second signaling and a third signaling, of which the first signaling indicates a first duration set, and the second signaling indicates a first time window, any duration in the first duration set being a duration in the first time window, and a timing of each duration in the first time window referring to a receiving timing of the first node-side, and the third signaling indicates a first time length; and transmitting a first signal in a first target duration according to a timing of the first target duration, the first target duration being deferred by a first time length is a first reference duration, and the first reference duration is a duration in a first duration set;

herein, the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window; one transmitter of the first signaling includes a second node.

In one embodiment, the principle of the above method lies in that a first node transmits a radio signal in sidelink according to an uplink (UL) timing for a base station-side and then converts a Timing Advance (TA) between the base station and the first node into a first index to be transmitted to a terminal in V2X communication with the first node, so as to inform a receiving end for receiving V2X signals of the position of either a slot or a sub-frame that is occupied by the first signal under a transmitting timing of the first node.

In one embodiment, an advantage of the above method is that the practice of making all V2X transmissions conform with the UL timing of the base station can avoid interferences of uplink transmission from a cellular link with V2X; and with a first index, a V2X receiving end will know the position of a sidelink synchronization signal or a Physical Sidelink Broadcasting Channel (PSBCH) in a V2X transmitting end, which can be further used for inferring a sequence number of a slot or a sub-frame where a subsequence PSCCH and PSSCH are located.

In one embodiment, another advantage of the above method is that the above method is more suitable for a UE-specific time-frequency resource pool configured with V2X, thus a V2X receiving end is only required to operate in accordance with the timing of a transmitting end rather than that all terminals base their operations on the UL timing for the base station side, contributing to more flexible resource configurations.

According to one aspect of the present disclosure, the above method is characterized in comprising:

transmitting a second signal;

herein, the second signal comprises second information, the second information being used to determine a second time length; the second time length is dependent on a time interval between a start of the second reference duration in time domain and a start of the first target duration in time domain.

In one embodiment, an advantage of the above method is that the first information reflects an offset of a first reference duration at sub-frame level or slot level due to transmission delay, while the second information is an offset with smaller granularity at a quasi-multicarrier-symbol level due to transmission delay, therefore, the third node is enabled to determine a transmission delay or TA from a second node to a first node more precisely.

According to one aspect of the present disclosure, the above method is characterized in comprising:

transmitting a target signal;

herein, the target signal indicates a second duration set out of a second time window, the first target duration is a duration in the second time window, and an index of the first target duration in the second time window is the first index.

In one embodiment, an advantage of the above method is that the second duration set is time-domain resources for V2X transmission determined by the first node depending on timing synchronization of a PC-5 link, which facilitates a third node's determination of time-domain resources occupied by following SCI and PSSCH from the first node, as well as when a Physical Sidelink Feedback Channel (PSFCH) shall be transmitted.

According to one aspect of the present disclosure, the above method is characterized in comprising:

transmitting a third signal and a fourth signal; and receiving a fifth signaling;

herein, both transmission of the third signal and of the fourth signal refer to a timing in the second duration set, and reception of the fifth signaling refers to the timing in the second duration set, the third signal comprises configuration information of the fourth signal, and the fifth signaling is used to determine whether the fourth signal is correctly received.

In one embodiment, an advantage of the above method is that transmissions of a first node in sidelink are determined based on the second duration set, so the third node will be able to determine a more accurate time-domain position of actual V2X transmission; when the third node cannot get access to NTN, it still can communicate via V2X with the first node, without interfering with Uu interface.

According to one aspect of the present disclosure, the above method is characterized in comprising:

receiving a synchronization signal;

herein, a start time of reception of the synchronization signal in the first node is a start time for a multicarrier symbol occupied by the synchronization signal in a duration to which the synchronization signal belongs.

In one embodiment, the essence of the above method lies in through a synchronization signal from a base station, a first node can determine a downlink (DL) synchronization at multicarrier-symbol level.

The present disclosure provides a method in a second node for wireless communications, comprising:

transmitting a first signaling, a second signaling and a third signaling, of which the first signaling indicates a first duration set, and the second signaling indicates a first time window, any duration in the first duration set being a duration in the first time window, and a timing of each duration in the first time window refers to a receiving timing of the first node-side, and the third signaling indicates a first time length;

herein, one receiver of the first signaling includes the first node, the first node transmitting a first signal in a first target duration according to a timing of the first target duration, the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

According to one aspect of the present disclosure, the above method is characterized in comprising:

transmitting a synchronization signal;

herein, a start time of reception of the synchronization signal in the first node is a start time for a multicarrier symbol occupied by the synchronization signal in a duration to which the synchronization signal belongs.

The present disclosure provides a method in a third node for wireless communications, comprising:

receiving a first signal in a first target duration according to a timing of the first target duration, the first target duration being deferred by a first time length is a first reference duration, and the first reference duration is a duration in a first duration set;

herein, a transmitter of the first signal is a first node; the first node determines the first duration set by receiving a first signaling, and determines a first time window by receiving a second signaling, any duration in the first duration set being a duration in the first time window, and a timing of each duration in the first time window referring to a receiving timing of the first-node side, and the first node determines the first time length by receiving a third signaling; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

According to one aspect of the present disclosure, the above method is characterized in comprising:

receiving a second signal;

herein, the second signal comprises second information, the second information being used to determine a second time length; the second time length is dependent on a time interval between a start of the second reference duration in time domain and a start of the first target duration in time domain.

According to one aspect of the present disclosure, the above method is characterized in comprising:

receiving a target signal;

herein, the target signal indicates a second duration set out of a second time window, the first target duration is a duration in the second time window, and an index of the first target duration in the second time window is the first index.

According to one aspect of the present disclosure, the above method is characterized in comprising:
receiving a third signal and a fourth signal; and
transmitting a fifth signaling;
herein, both transmission of the third signal and of the fourth signal refer to a timing in the second duration set, and reception of the fifth signaling refers to the timing in the second duration set, the third signal comprises configuration information of the fourth signal, and the fifth signaling is used to determine whether the fourth signal is correctly received.

The present disclosure provides a first node for wireless communications, comprising:
a first receiver, receiving a first signaling, a second signaling and a third signaling, of which the first signaling indicates a first duration set, and the second signaling indicates a first time window, any duration in the first duration set being a duration in the first time window, and a timing of each duration in the first time window referring to a receiving timing of the first node-side, and the third signaling indicates a first time length; and
a first transceiver, transmitting a first signal in a first target duration according to a timing of the first target duration, the first target duration being deferred by a first time length is a first reference duration, and the first reference duration is a duration in a first duration set;
herein, the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window; one transmitter of the first signaling includes a second node.

The present disclosure provides a second node for wireless communications, comprising:
a first transmitter, transmitting a first signaling, a second signaling and a third signaling, of which the first signaling indicates a first duration set, and the second signaling indicates a first time window, any duration in the first duration set being a duration in the first time window, and a timing of each duration in the first time window refers to a receiving timing of the first node-side, and the third signaling indicates a first time length;
herein, one receiver of the first signaling includes the first node, the first node transmitting a first signal in a first target duration according to a timing of the first target duration, the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window The present disclosure provides a third node for wireless communications, comprising:
a second transceiver, receiving a first signal in a first target duration according to a timing of the first target duration, the first target duration being deferred by a first time length is a first reference duration, and the first reference duration is a duration in a first duration set;
herein, a transmitter of the first signal is a first node; the first node determines the first duration set by receiving a first signaling, and determines a first time window by receiving a second signaling, any duration in the first duration set being a duration in the first time window, and a timing of each duration in the first time window referring to a receiving timing of the first-node side, and the first node determines the first time length by receiving a third signaling; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the present disclosure has the following advantages compared with the prior art:
by basing V2X transmissions totally on the UL timing of a base station, one can avoid potential interference with V2X from uplink transmission in a cellular link; and through a first index, a V2X receiving end can be made aware of where a sidelink synchronization signal or a PSBCH is in a V2X transmitting end, which afterwards can be used to infer a sequence number of a slot or a sub-frame in which a PSCCH or a PSSCH that follows is located;
the above method is more applicable to a UE-specific V2X-configuring time-frequency resource pool, and a V2X receiving end only needs to follow the timing of a transmitting end when operating instead of requiring all terminals to refer to the UL timing of a base station, thereby making the resource configuration more flexible;
the first information reflects an offset of a first reference duration at a sub-frame level or a slot level caused by transmission delay, and the second information is an offset nearly at a multicarrier-symbol level and with smaller granularity caused by transmission delay, therefore, the third node can determine the transmission delay or TA between a second node and a first node in a more precise way;
the second duration set is time-domain resources determined by the first node according to its own timing synchronization that are used for V2X transmission, thus making it easier for a third node to determine time-domain resources occupied by subsequent SCI and PSSCH from the first node and when to transmit a PSFCH.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
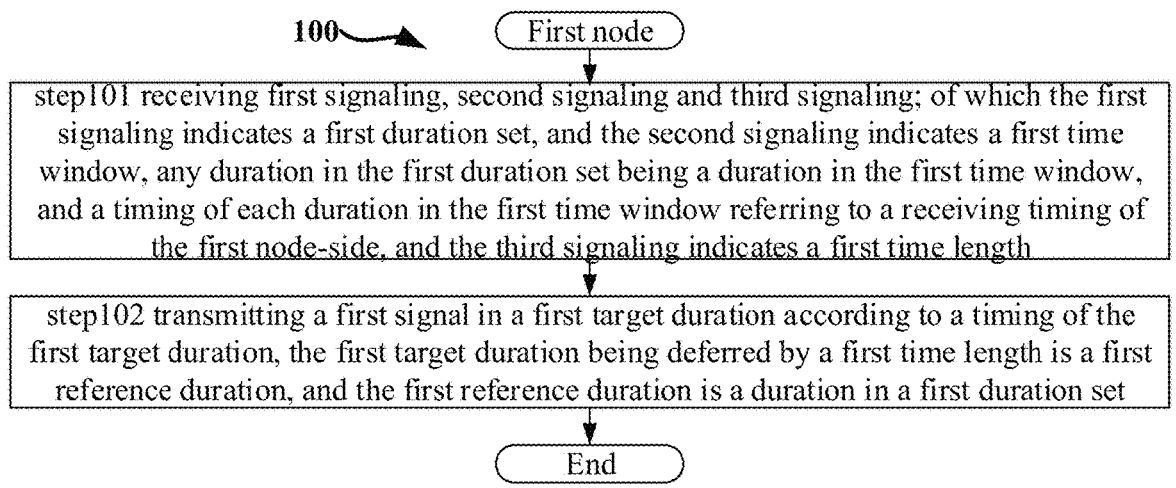
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure receives a first signaling, a second signaling and a third signaling in step 101, of which the first signaling indicates a first duration set, and the second signaling indicates a first time window, any duration in the first duration set being a duration in the first time window, and a timing of each duration in the first time window refers to a receiving timing of the first-node side, and the third signaling indicates a first time length; transmits a first signal in a first target duration according to a timing of the first target duration, the first target duration being deferred by a first time length is a first reference duration, and the first reference duration is a duration in a first duration set.

In Embodiment 1, the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the phrase that the second reference duration and the first target duration are overlapping in time domain includes a meaning that there is at least one multi-carrier symbol belonging to both time-domain resources occupied by the second reference duration and time-domain resources occupied by the first target duration.

In one embodiment, the phrase that the second reference duration and the first target duration are overlapping in time domain includes a meaning that a start time for the second reference duration in time domain is no later than a start time for the first target duration in time domain, and an end time for the second reference duration in time domain is later than the start time for the first target duration in time domain.

In one embodiment, the phrase that the second reference duration and the first target duration are overlapping in time domain includes a meaning that a start time for the second reference duration in time domain is later than a start time for the first target duration in time domain, and an end time for the first target duration in time domain is no later than an end time for the second reference duration in time domain.

In one embodiment, the phrase that the first reference duration and the first target duration are non-overlapping in time domain includes a meaning that there isn't a multicarrier symbol belonging to time-domain resources occupied by the first reference duration and time-domain resources occupied by the first target duration at the same time.

In one embodiment, the phrase that the first reference duration and the first target duration are non-overlapping in time domain includes a meaning that both a start time and an end time for the second reference duration in time domain are no later than a start time for the first target duration in time domain, or both a start time and an end time for the second reference duration in time domain are later than a start time for the first target duration in time domain.

In one embodiment, the transmitter transmitting the first signaling is a second node.

In one embodiment, the second node is a base station in NTN.

In one embodiment, the second node is a non-terrestrial base station.

In one embodiment, the second node is one of a Geostationary Earth Orbiting (GEO) satellite, a Medium Earth Orbiting (MEO) satellite, a Low Earth Orbit (LEO) satellite, a Highly Elliptical Orbiting (HEO) satellite or an Airborne Platform.

In one embodiment, the first duration set is comprised of K1 durations, K1 being a positive integer.

In one subembodiment, the K1 durations are K1 slots, respectively.

In one subembodiment, the K1 durations are K1 subframes, respectively.

In one subembodiment, the K1 durations are K1 radio frames, respectively.

In one subembodiment, the K1 durations are K1 mini-slots, respectively.

In one embodiment, the first duration set is time-domain resources reserved according to timing of a second node that are used for non-cellular link transmissions.

In one subembodiment, the non-cellular link includes sidelink.

In one subembodiment, the non-cellular link is used for transmission of V2X traffics.

In one embodiment, the second signaling is transmitted on a Physical Broadcasting Channel (PBCH).

In one embodiment, the first signal is transmitted on a PSBCH.

In one embodiment, the first signal is transmitted on a PSDCH.

In one embodiment, the first signal is transmitted on a Sidelink Broadcasting Channel (SL-BCH).

In one embodiment, the first signal is transmitted on a MasterInformationBlock-SL.

In one embodiment, the first index is a non-negative integer.

In one embodiment, the second signaling indicates a position of a duration occupied by the second signaling in the first time window, the duration occupied by the second signaling being a duration in the first time window.

In one embodiment, the second signaling occupies a second target duration; a start time for reception of the second signaling by the first node is a start of the second target duration; and an end time for reception of the second signaling by the first node is an end of the second target duration.

In one embodiment, the second signaling occupies part of multicarrier symbols in a second target duration; a start time for reception of the second signaling by the first node is a start time for the part of multicarrier symbols in the second target duration; and an end time for reception of the second signaling by the first node is an end time for the part of multicarrier symbols in the second target duration.

In one embodiment, the second node in the present disclosure transmits the first signaling, the second signaling and the third signaling.

In one embodiment, the first time length is equal to a transmission delay from the first node to the second node.

In one embodiment, the first time length is dependent on a quantized value of a transmission delay from the first node to the second node.

In one embodiment, the first time length is equal to twice the quantized value of a transmission delay from the first node to the second node.

In one embodiment, the first time length is measured in slots.

In one embodiment, the first time length is measured in milliseconds (ms).

In one embodiment, the first time length is measured in sub-frames.

In one embodiment, the first time length is measured in a time length occupied by a multicarrier symbol.

In one embodiment, the first time length is measured in microseconds (µs).

In one embodiment, the first time length is measured in 1/30720 ms.

In one embodiment, the first time length is measured in 1/Xms, X being a positive integral multiple of 30720.

In one embodiment, the first time length increases along with a distance between the first node and the second node.

In one embodiment, the first time length is dependent on height of the second node.

In one embodiment, the first time length is dependent on an inclination angle of the second node to the first node.

In one embodiment, the first time length is a Timing Advance of uplink transmission from the first node to the second node.

In one embodiment, the second reference duration is an earlier duration in the first time window that overlaps with the first target duration.

In one embodiment, the second reference duration is a longer-lasting duration in the first time window that overlaps with the first target duration.

In one embodiment, when there are two durations in the first time window that respectively overlap with the first target duration for a same period of time, the second reference duration is an earlier one of the two durations; when there are two durations in the first time window that respectively overlap with the first target duration for different periods of time, the second reference duration is a longer-lasting one of the two durations.

In one embodiment, a timing for a duration comprises a start of the duration and an end of the duration.

In one embodiment, a timing for a duration comprises a start time for each multicarrier symbol and an end time for each multicarrier symbol in the duration.

In one embodiment, each duration in the first time window is of an equal length.

In one embodiment, each duration in the first time window comprises 14 multicarrier symbols.

In one embodiment, each duration in the first time window lasts as long as 1 ms.

In one embodiment, each duration in the first time window lasts as long as 0.5 ms.

In one embodiment, each duration in the first time window is a sub-frame.

In one embodiment, each duration in the first time window is a slot.

In one embodiment, the first signaling, the second signaling and the third signaling respectively comprise a System Information Block (SIB), a Master Information Block (MIB) and a Timing Advance (TA) Command.

In one embodiment, the first signaling, the second signaling and the third signaling respectively comprise higher-layer signalings.

In one embodiment, the first signaling and the second signaling are broadcast, while the third signaling is unicast.

In one embodiment, the second signaling is broadcast, while the first signaling and the third signaling are unicast.

In one embodiment, the first signaling, the second signaling and the third signaling respectively comprise a Radio Resource Control (RRC) layer signaling, an RRC layer signaling and a Media Access Control (MAC) layer signaling.

In one embodiment, the multicarrier symbol in the present disclosure is an Orthogonal Frequency Division Multiplexing (OFDM) symbol.

In one embodiment, the multicarrier symbol in the present disclosure is a Single-Carrier Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is a Cyclic Prefix (CP)-including OFDM symbol.

In one embodiment, the multicarrier symbol in the present disclosure is a CP-including Discrete Fourier Transform Spreading Orthogonal Frequency Division Multiplexing (DFT-s-OFDM) symbol.

In one embodiment, the first duration set is time-domain resources used for V2X transmission configured by the second node according to its own timing.

In one embodiment, the first duration set is indicated by a bitmap.

In one embodiment, the first time window is determined according to a DL timing received by the first node.

In one embodiment, the first time window comprises a positive integer number of durations, and sequence numbers of the positive integer number of durations are respectively determined according to the DL timing received by the first node.

In one embodiment, the second node does not receive an uplink transmission from the first node in the first duration set.

In one embodiment, the second node does not receive an uplink transmission from a terminal served by the second node in the first duration set.

In one embodiment, the first signal is transmitted in sidelink.

In one embodiment, the first index is a radio frame number.

In one embodiment, the first index is a sub-frame number.

In one embodiment, the first index is a slot number.

In one embodiment, an index of the second reference duration in the first time window is a radio frame number.

In one embodiment, an index of the second reference duration in the first time window is a sub-frame number.

In one embodiment, an index of the second reference duration in the first time window is a slot number.

In one embodiment, the first signal is a radio signal.

In one embodiment, the first signal is a baseband channel.

Embodiment 2

Figure 2:
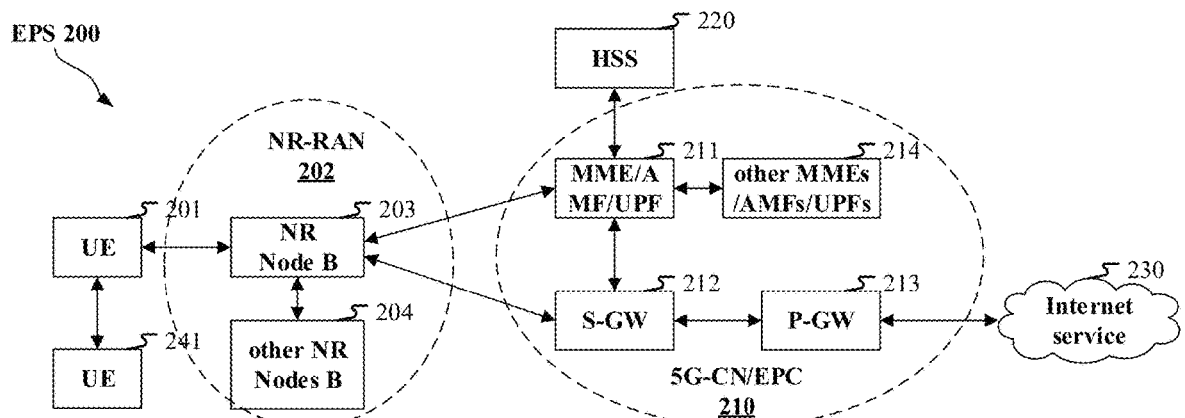
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, and a UE241 in sidelink communication with the UE(s)201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the gNB203 corresponds to the second node in the present disclosure.

In one embodiment, the UE 241 corresponds to the third node in the present disclosure.

In one embodiment, an air interface between the UE201 and the gNB203 is a Uu interface.

In one embodiment, an air interface between the UE201 and the UE241 is a PC-5 interface.

In one embodiment, a radio link between the UE201 and the gNB203 is a cellular link.

In one embodiment, a radio link between the UE201 and the UE241 is a sidelink.

In one embodiment, the first node in the present disclosure is a terminal within the coverage of the gNB203.

In one embodiment, the third node in the present disclosure is a terminal out of the coverage of the gNB203.

In one embodiment, the third node in the present disclosure is a terminal within the coverage of the gNB203.

In one embodiment, the first node and the third node belong to a V2X Pair.

In one embodiment, the first node is an automobile.

In one embodiment, the first node is a vehicle.

In one embodiment, the second node is a base station.

In one embodiment, the third node is a vehicle.

In one embodiment, the third node is an automobile.

In one embodiment, the third node is a Road Side Unit (RSU).

In one embodiment, the third node is a Groups Header of a terminal group.

Embodiment 3

Figure 3:
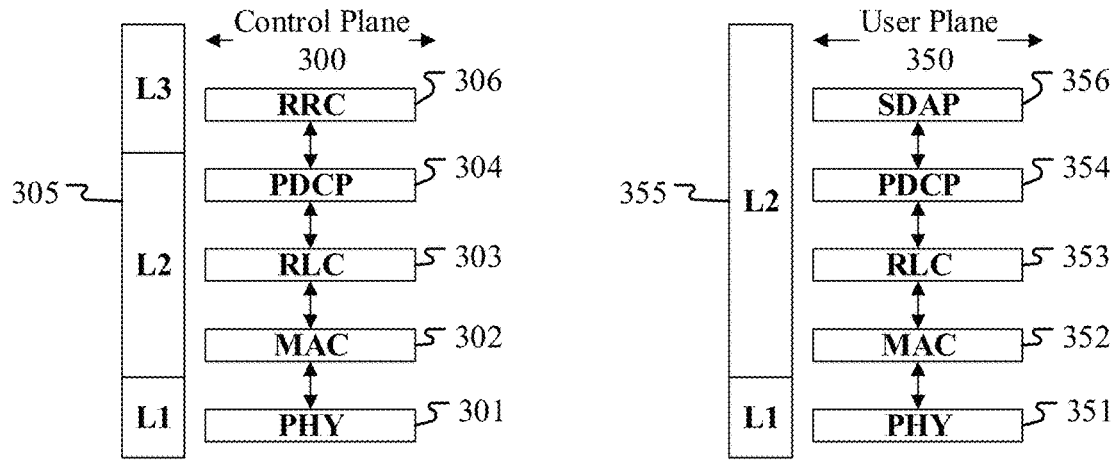
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling is generated by the RRC 306.

In one embodiment, the second signaling is generated by the RRC 306.

In one embodiment, the second signaling is generated by the MAC352, or by the MAC302.

In one embodiment, the third signaling is generated by the MAC352, or by the MAC302.

In one embodiment, the third signaling is generated by the RRC 306.

In one embodiment, the first signal is generated by the MAC352, or by the MAC302.

In one embodiment, the first signal is generated by the RRC 306.

In one embodiment, the second signal is generated by the MAC352, or by the MAC302.

In one embodiment, the second signal is generated by the RRC 306.

In one embodiment, the target signal is generated by the MAC352, or by the MAC302.

In one embodiment, the target signal is generated by the RRC 306.

In one embodiment, the third signal is generated by the PHY301, or by the PHY351.

In one embodiment, the fourth signal is generated by the PHY301, or by the PHY351.

In one embodiment, the fourth signal is generated by the MAC352, or by the MAC302.

In one embodiment, the fifth signaling is generated by the PHY301, or by the PHY351.

In one embodiment, the fifth signaling is generated by the MAC352, or by the MAC302.

In one embodiment, the synchronization signal is generated by the PHY301, or by the PHY351.

Embodiment 4

Figure 4:
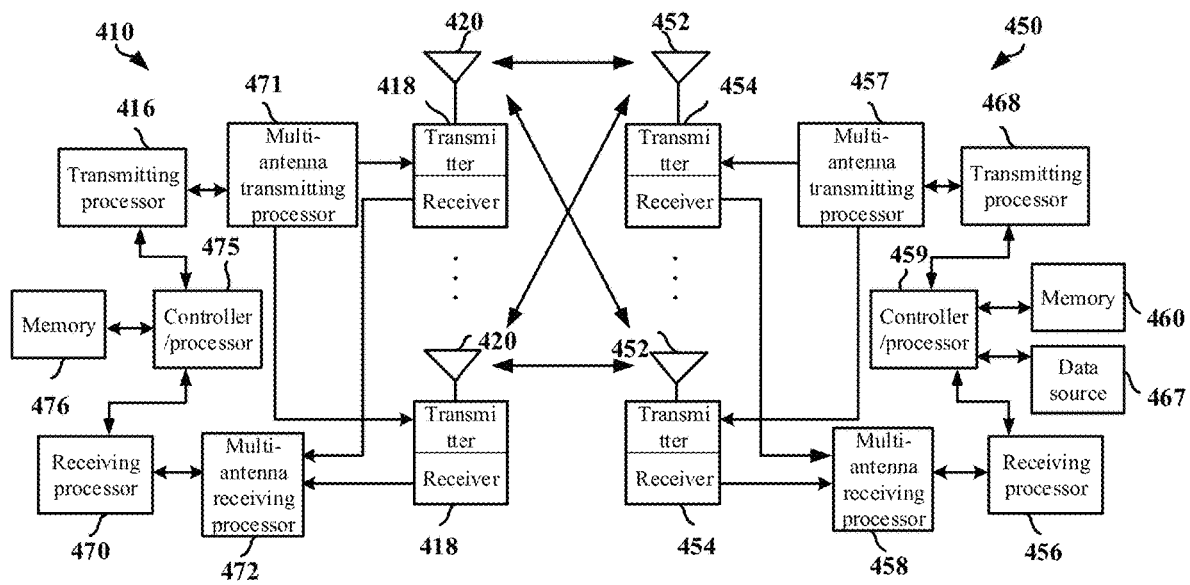
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling, a second signaling and a third signaling, of which the first signaling indicates a first duration set, and the second signaling indicates a first time window, any duration in the first duration set being a duration in the first time window, and a timing of each duration in the first time window referring to a receiving timing of the first node-side, and the third signaling indicates a first time length; and transmits a first signal in a first target duration according to a timing of the first target duration, the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the first communication device 450 comprises a memory that stores a computer readable instruction program. The computer readable instruction program generates actions when executed by at least one processor. The actions include: receiving a first signaling, a second signaling and a third signaling, of which the first signaling indicates a first duration set, and the second signaling indicates a first time window, any duration in the first duration set being a duration in the first time window, and a timing of each duration in the first time window referring to a receiving timing of the first node-side, and the third signaling indicates a first time length; and transmitting a first signal in a first target duration according to a timing of the first target duration, the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling, a second signaling and a third signaling, of which the first signaling indicates a first duration set, and the second signaling indicates a first time window, any duration in the first duration set being a duration in the first time window, and a timing of each duration in the first time window refers to a receiving timing of the first node-side, and the third signaling indicates a first time length; one receiver of the first signaling includes the first node, the first node transmitting a first signal in a first target duration according to a timing of the first target duration, the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the second communication device 410 comprises a memory that stores a computer readable instruction program. The computer readable instruction program generates an action when executed by at least one processor. The action includes transmitting a first signaling, a second signaling and a third signaling, of which the first signaling indicates a first duration set, and the second signaling indicates a first time window, any duration in the first duration set being a duration in the first time window, and a timing of each duration in the first time window refers to a receiving timing of the first node-side, and the third signaling indicates a first time length; one receiver of the first signaling includes the first node, the first node transmitting a first signal in a first target duration according to a timing of the first target duration, the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the second communication device 410 comprises at least one processor and at least one memory. The at least one memory comprises computer program codes. The at least one memory and the computer program codes are configured to be used in collaboration with the at least one processor. The second communication device 410 at least receives a first signal in a first target duration according to a timing of the first target duration, the first target duration being deferred by a first time length is a first reference duration, and the first reference duration is a duration in a first duration set; a transmitter of the first signal is a first node; the first node determines the first duration set by receiving a first signaling, and determines a first time window by receiving a second signaling, any duration in the first duration set being a duration in the first time window, and a timing of each duration in the first time window referring to a receiving timing of the first-node side, and the first node determines the first time length by receiving a third signaling; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the second communication device 410 comprises a memory that stores a computer readable instruction program. The computer readable instruction program generates an action when executed by at least one processor. The action includes receiving a first signal in a first target duration according to a timing of the first target duration, the first target duration being deferred by a first time length is a first reference duration, and the first reference duration is a duration in a first duration set; a transmitter of the first signal is a first node; the first node determines the first duration set by receiving a first signaling, and determines a first time window by receiving a second signaling, any duration in the first duration set being a duration in the first time window, and a timing of each duration in the first time window referring to a receiving timing of the first-node side, and the first node determines the first time length by receiving a third signaling; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the second communication device 410 is a base station.

In one embodiment, the second communication device 410 is a UE.

In one embodiment, at least one of the antenna 452, the receiver 454, the multi-antenna receiving processor 458, the receiving processor 456 or the controller/processor 459 is used for receiving a first signaling, a second signaling and a third signaling; at least one of the antenna 420, the transmitter 418, the multi-antenna transmitting processor 471, the transmitting processor 416 or the controller/processor 475 is used for transmitting a first signaling, a second signaling and a third signaling.

In one embodiment, at least one of the antenna 420, the transmitter 454, the multi-antenna transmitting processor 457, the transmitting processor 468 or the controller/processor 459 is used for transmitting a first signal in a first target duration according to a timing of the first target duration; at least one of the antenna 420, the receiver 418, the multi-antenna receiving processor 472, the receiving processor 470 or the controller/processor 475 is used for receiving a first signal in a first target duration according to a timing of the first target duration.

In one embodiment, at least one of the antenna 420, the transmitter 454, the multi-antenna transmitting processor 457, the transmitting processor 468 or the controller/processor 459 is used for transmitting a second signal; at least one of the antenna 420, the receiver 418, the multi-antenna receiving processor 472, the receiving processor 470 or the controller/processor 475 is used for receiving a second signal.

In one embodiment, at least one of the antenna 420, the transmitter 454, the multi-antenna transmitting processor 457, the transmitting processor 468 or the controller/processor 459 is used for transmitting a target signal; at least one of the antenna 420, the receiver 418, the multi-antenna receiving processor 472, the receiving processor 470 or the controller/processor 475 is used for receiving a target signal.

In one embodiment, at least one of the antenna 420, the transmitter 454, the multi-antenna transmitting processor 457, the transmitting processor 468 or the controller/processor 459 is used for transmitting a third signal and a fourth signal; at least one of the antenna 420, the receiver 418, the multi-antenna receiving processor 472, the receiving processor 470 or the controller/processor 475 is used for receiving a third signal and a fourth signal.

In one embodiment, at least one of the antenna 452, the receiver 454, the multi-antenna receiving processor 458, the receiving processor 456 or the controller/processor 459 is used for receiving a fifth signaling; at least one of the antenna 420, the transmitter 418, the multi-antenna transmitting processor 471, the transmitting processor 416 or the controller/processor 475 is used for transmitting a fifth signaling.

In one embodiment, at least one of the antenna 452, the receiver 454, the multi-antenna receiving processor 458, the receiving processor 456 or the controller/processor 459 is used for receiving a synchronizing signaling, a second signaling and a third signaling; at least one of the antenna 420, the transmitter 418, the multi-antenna transmitting processor 471, the transmitting processor 416 or the controller/processor 475 is used for transmitting a first signaling, a second signaling and a synchronizing signaling.

Embodiment 5

Figure 5:
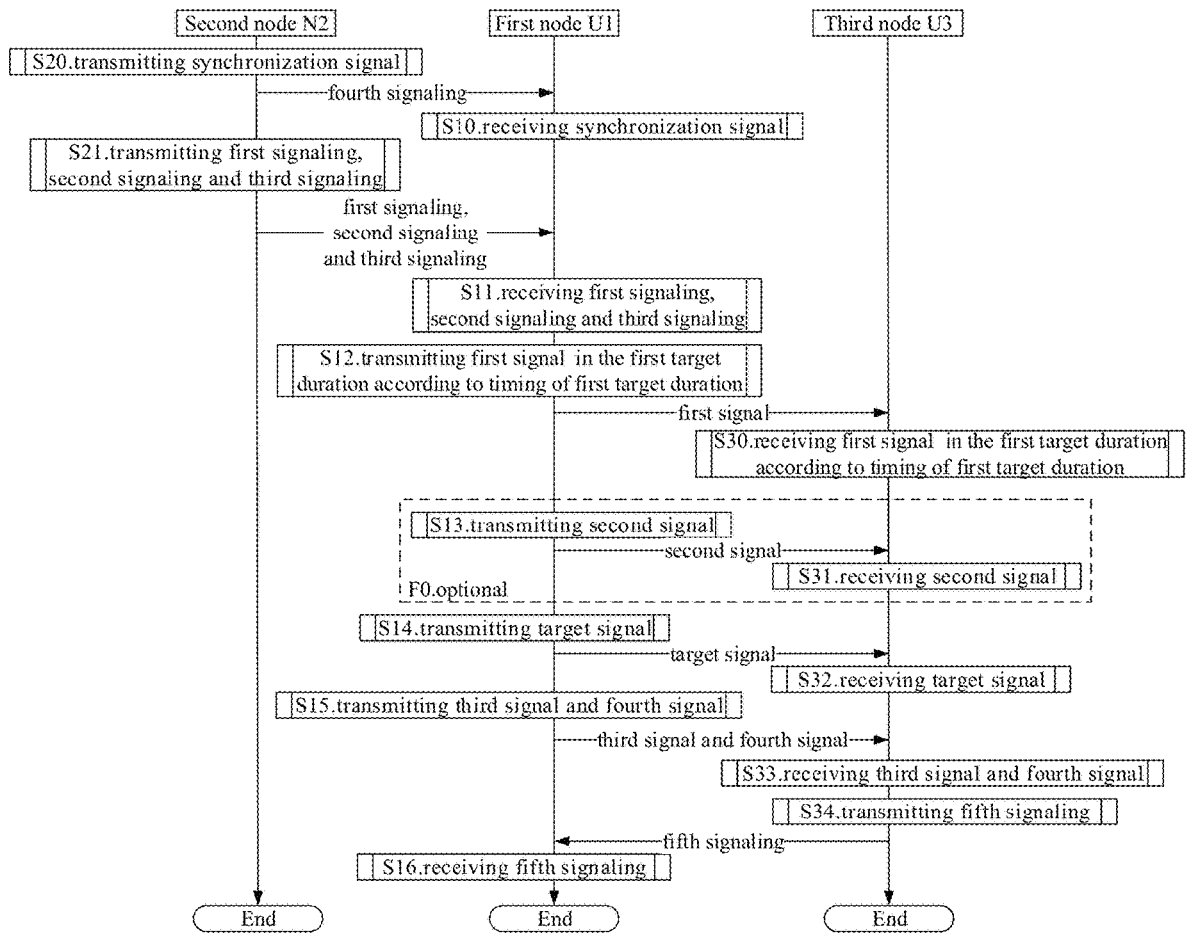
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node N2 are in communication via a Uu link, while the first node U1 and a third node U3 are in communication via a sidelink; the steps marked by the box F0 in this figure is optional.

The first node U1 receives a synchronization signal in step S10; and receives a first signaling, a second signaling and a third signaling in step S11; transmits a first signal in a first target duration according to a timing of the first target duration in step S12; and transmits a second signal in step S13; transmits a target signal in step S14; transmits a third signal and a fourth signal in step S15; and receives a fifth signaling in step S16.

The second node N2 transmits a synchronization signal in step S20; and transmits a first signaling, a second signaling and a third signaling in step S21.

The third node U3 receives a first signal in a first target duration according to a timing of the first target duration in step S30; and receives a second signal in step S31; receives a target signal in step S32; receives a third signal and a fourth signal in step S33; and transmits a fifth signaling in step S34.

In Embodiment, the first signaling indicates a first duration set, and the second signaling indicates a first time window, any duration in the first duration set being a duration in the first time window, and a timing of each duration in the first time window referring to a receiving timing of the first node-side, and the third signaling indicates a first time length; the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window; the second signal comprises second information, the second information being used to determine a second time length; the second time length is dependent on a time interval between a start of the second reference duration in time domain and a start of the first target duration in time domain; the target signal indicates a second duration set out of a second time window, the first target duration is a duration in the second time window, and an index of the first target duration in the second time window is the first index; both transmission of the third signal and of the fourth signal refer to a timing in the second duration set, and reception of the fifth signaling refers to the timing in the second duration set, the third signal comprises configuration information of the fourth signal, and the fifth signaling is used to determine whether the fourth signal is correctly received; a start time of reception of the synchronization signal in the first node is a start time for a multi-carrier symbol occupied by the synchronization signal in a duration to which the synchronization signal belongs.

In one embodiment, the second time length is measured in milliseconds (ms).

In one embodiment, the second time length is measured in a time length occupied by a multicarrier symbol.

In one embodiment, the second time length is measured in microseconds (μs).

In one embodiment, the second time length is measured in 1/30720 ms.

In one embodiment, the second time length is measured in 1/Yms, Y being a positive integral multiple of 30720.

In one embodiment, the second time length is equal to a time interval between a start of the second reference duration in time domain and a start of the first target duration in time domain.

In one embodiment, the second time length being a positive value means being advanced, or the second time length being a negative value means being deferred.

In one embodiment, the second time length being a positive value means being deferred, or the second time length being a negative value means being advanced.

In one embodiment, the second signal is transmitted in sidelink.

In one embodiment, the target signal is transmitted in sidelink.

In one embodiment, the second signal is transmitted by a PSBCH.

In one embodiment, the second signal is transmitted by a PSDCH.

In one embodiment, the second information is transmitted by a SL-BCH.

In one embodiment, the second information is transmitted by a MasterInformationBlock-SL.

In one embodiment, the second time window determines a timing in sidelink according to a transmitting timing of the first node U1.

In one embodiment, the third node U3 determines a receiving timing for a radio signal from the first node U1 to the third node U3 according to the first index.

In one embodiment, the third node U3 determines a transmitting timing for a radio signal from the third node U3 to the first node U1 according to the first index.

In one embodiment, the second duration set is indicated by a bitmap.

In one embodiment, any duration in the second duration set, after being moved by the second time length in time domain, overlaps with a duration in the first duration set, the second time length being no longer than a duration.

In one embodiment, any duration in the second duration set, after being moved by the second time length in time domain, overlaps with a duration in the first duration set, the second time length being longer than a duration.

In one embodiment, any duration in the second time window, after being moved by the second time length in time domain, overlaps with a duration in the first time window, the second time length being no longer than a duration.

In one embodiment, durations in the second duration set correspond to durations in the first duration set respectively, and a time interval from any duration in the second duration set to a corresponding duration in the first duration set is as same as a time interval from the first target duration to the second reference duration.

In one embodiment, the third signal is Sidelink Control Information (SCI).

In one embodiment, a physical layer channel occupied by the third signal includes a PSCCH.

In one embodiment, a physical layer channel occupied by the fourth signal includes a Physical Sidelink Shared Channel (PSSCH).

In one embodiment, a physical layer channel occupied by the fifth signaling includes a PSFCH.

In one embodiment, the configuration information of the fourth signal comprised by the third signal comprises at least one of time-domain resources occupied by the fourth signal, frequency-domain resources occupied by the fourth signal, a Modulation and Coding Status (MCS) employed by the fourth signal, a Redundancy Version (RV) adopted by the fourth signal, a New Data Indicator (NDI) corresponding to the fourth signal or a HARQ process ID employed by the fourth signal.

In one embodiment, the phrase that both transmission of the third signal and of the fourth signal refer to a timing in the second duration set means that a boundary of a multicarrier symbol occupied by transmitting the third signal is aligned with a boundary of a multicarrier symbol in the second duration set, and a boundary of a multicarrier symbol occupied by transmitting the fourth signal is aligned with a boundary of a multicarrier symbol in the second duration set.

In one embodiment, the phrase that both transmission of the third signal and of the fourth signal refer to a timing in the second duration set means that the third signal is transmitted in an n-th duration in the second duration set, and the third signal indicates that the fourth signal is transmitted in a k-th duration that follows a duration occupied by the third signal, which means that the fourth signal is transmitted in a (n+k)-th duration in the second duration set; both n and k are non-negative integers.

In one embodiment, the phrase that reception of the fifth signaling refers to the timing in the second duration set means that a boundary of a multicarrier symbol occupied by receiving the fifth signaling is aligned with a boundary of a multicarrier symbol in the second duration set.

In one embodiment, the phrase that reception of the fifth signaling refers to the timing in the second duration set means that the third signal is transmitted in an n-th duration in the second duration set, and the fifth signaling is received in a k1-th duration that follows a duration occupied by the third signal, which means that the first node U1 receives the fifth signaling in a (n+k1)-th duration in the second duration set; both n and k1 are non-negative integers.

In one embodiment, the phrase that reception of the fifth signaling refers to the timing in the second duration set means that the fourth signal is transmitted in an n1-th duration in the second duration set, and the fifth signaling is received in a k2-th duration that follows a duration occupied by the fourth signal, which means that the first node U1 receives the fifth signaling in a (n1+k2)-th duration in the second duration set; both n1 and k2 are non-negative integers.

In one embodiment, the synchronization signal comprises a Primary Synchronization Signal (PSS) and a Secondary Synchronization Signal (SSS).

In one embodiment, the synchronization signal comprises a pseudo-random sequence.

In one embodiment, the synchronization signal comprises a Zadoff-Chu sequence.

In one embodiment, the first time window is used to determine DL slot synchronization of the first node U1, and the synchronization signal is used to determine DL multicarrier symbol synchronization of the first node U1.

In one embodiment, the first time window is used to determine DL sub-frame synchronization of the first node U1, and the synchronization signal is used to determine DL multicarrier symbol synchronization of the first node U1.

In one embodiment, the first time window is used to determine DL radio frame synchronization of the first node U1, and the synchronization signal is used to determine DL multicarrier symbol synchronization of the first node U1.

In one embodiment, the first time window is determined according to the second node N2's own timing.

In one embodiment, sequence numbers of durations comprised in the first time window have been compensated depending on a transmission delay corresponding to a first distance, the first distance being a distance from the second node N2 to a Perigee.

In one subembodiment, the compensation means that a synchronization signal in the first time window is detected in an m-th slot deemed by the side of the first node U1, and a transmission delay corresponding to the first distance is of a quantized value of L slots, then the second node N2 transmits the synchronization signal in the (m−L)-th slot.

In one subembodiment, the compensation means that a synchronization signal in the first time window is transmitted in an m-th slot in the side of the second node N2, and a transmission delay corresponding to the first distance is of a quantized value of L slots, then the second node N2 detects the synchronization signal in the (m+L)-th slot, which, as the second node deems, is an m-th slot in downlink.

In one embodiment, the second time window comprises K1 durations, K1 being a positive integer.

In one embodiment, each duration in the second time window is of an equal length.

In one embodiment, each duration in the second time window comprises 14 multicarrier symbols.

In one embodiment, each duration in the second time window lasts as long as 1 ms.

In one embodiment, each duration in the second time window lasts as long as 0.5 ms.

In one embodiment, each duration in the second time window is a sub-frame.

In one embodiment, each duration in the second time window is a slot.

In one embodiment, the second signal is a radio signal.

In one embodiment, the second signal is a baseband channel.

In one embodiment, each duration in the second time window is a slot.

In one embodiment, the target signal is a radio signal.

In one embodiment, the target signal is a baseband channel.

Embodiment 6

Figure 6:
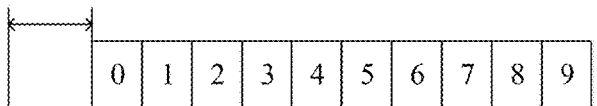
FIG. 6 illustrates a schematic diagram of a first time length according to one embodiment of the present disclosure.
Figure 6:
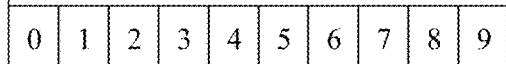

Embodiment 6 illustrates a schematic diagram of a first time length, as shown in FIG. 6. In FIG. 6, consecutive durations in the upper correspond to the second node's own timing, i.e., DL timing for a Uu interface of the first node; lower consecutive durations correspond to a transmitting timing in the case that the first node in the present disclosure transmits to the second node in the present disclosure, i.e., UL timing for a Uu interface of the first node; a time offset marked in the figure corresponds to the first time length; each rectangular box represents a duration, with a sequence number being marked by a letter.

In one embodiment, the first time length is equal to a sum of a first time value and a second time value.

In one subembodiment, the first time value is dependent on a distance between the second node and the first node.

In one subembodiment, the first time value is equal to twice as much as a transmission delay from the first node to the second node.

In one subsidiary embodiment of the above subembodiment, the TA does not comprise a TA corresponding to a distance from the second node to the ground.

In one subsidiary embodiment of the above subembodiment, the TA is equal to twice as much as a transmission delay after a distance between the second node and the first node being subtracted by a vertical distance of the second node above the ground.

In one subembodiment, the second time value is equal to 0.

In one subembodiment, the second time value is equal to 624 times the size of sampling time.

In one subembodiment, the first time value is equal to a product of NTA and Ts given in TS 36.211.

In one subembodiment, the second time value is equal to a product of 624 and Ts given in TS 36.211.

In one subembodiment, the second time value is dependent on UL-DL switching time of the first node.

Embodiment 7

Figure 7:
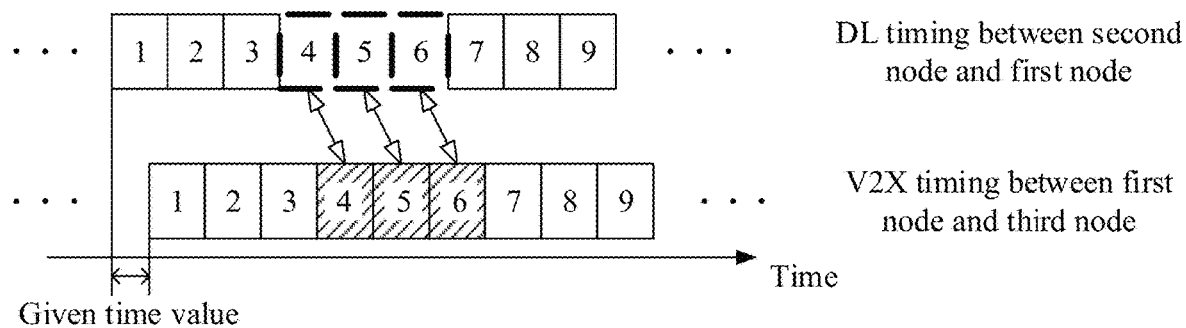
FIG. 7 illustrates a schematic diagram of a first duration set and a second duration set according to one embodiment of the present disclosure.

Embodiment 7 illustrates a schematic diagram of a first duration set and a second duration set, as shown in FIG. 7. In FIG. 7, the first duration set comprises K1 durations, and the second duration set comprises K1 durations, the K1 durations in the second duration set correspond to the K1 durations in the first duration set respectively; a time interval from any of the K1 durations comprised in the second duration set to a corresponding one of the K1 durations comprised in the first duration set is equal to a given time value. As illustrated in the figure, the first row corresponds to a DL timing between the first node and the second node, and the second row corresponds to a V2X timing between the first node and the third node; each rectangular box in FIG. 7 represents a duration, boxes in bold with broken frames make up the first duration set while those filled with slashes make up the second duration set.

In one embodiment, the given time value is equal to a time interval between the first target duration in the present disclosure and the second reference duration in the present disclosure.

In one embodiment, the given time value is equal to the second time length in the present disclosure.

Embodiment 8

Figure 8:
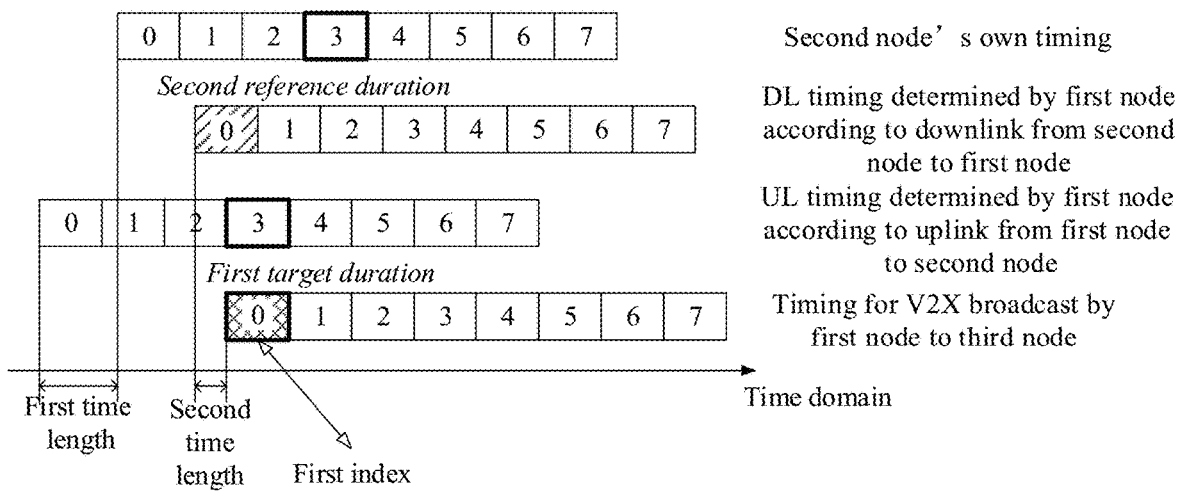
FIG. 8 illustrates a schematic diagram of a first target duration and a second reference duration according to one embodiment of the present disclosure.

Embodiment 8 illustrates a schematic diagram of a first target duration and a second reference duration, as shown in FIG. 8. In FIG. 8, the first row depicts a second node's own timing, the second row depicts a DL timing determined by a first node according to downlink from the second node to the first node, the third row depicts a UL timing determined by the first node according to uplink from the first node to the second node, and the fourth row depicts a timing for V2X broadcast by the first node to the third node; a second reference duration illustrated herein is an earlier duration of two durations in a first time window that overlap with the first target duration; the slash-filled box represents the second reference duration, and the cross-filled box represents the first target duration; a second time length illustrated herein is equal to a time interval between a start of the second reference duration in time domain and a start of the first target duration in time domain, and an index of the first target duration in a timing for a V2X transmission between the first node and the third node is a first index in the present disclosure.

In one embodiment, a duration in FIG. 8 marked by 3 according to the second node's own timing is a duration in the first duration set in the present disclosure.

In one embodiment, a duration framed with thick solid lines in FIG. 8 corresponds to a duration of the first node for V2X transmissions.

In one embodiment, the first target duration is a sub-frame, and the first index is used to indicate a sub-frame sequence number of the first target duration in a second time window in the present disclosure.

In one embodiment, the first target duration is a slot, and the first index is used to indicate a slot sequence number of the first target duration in a second time window in the present disclosure.

In one embodiment, the first target duration belongs to a first radio frame, the first index comprises a first sub-index, and the first sub-index is used to indicate a radio frame sequence number of the first radio frame in the second time window in the present disclosure. In one embodiment, the first index is a non-negative integer.

Embodiment 9

Figure 9:
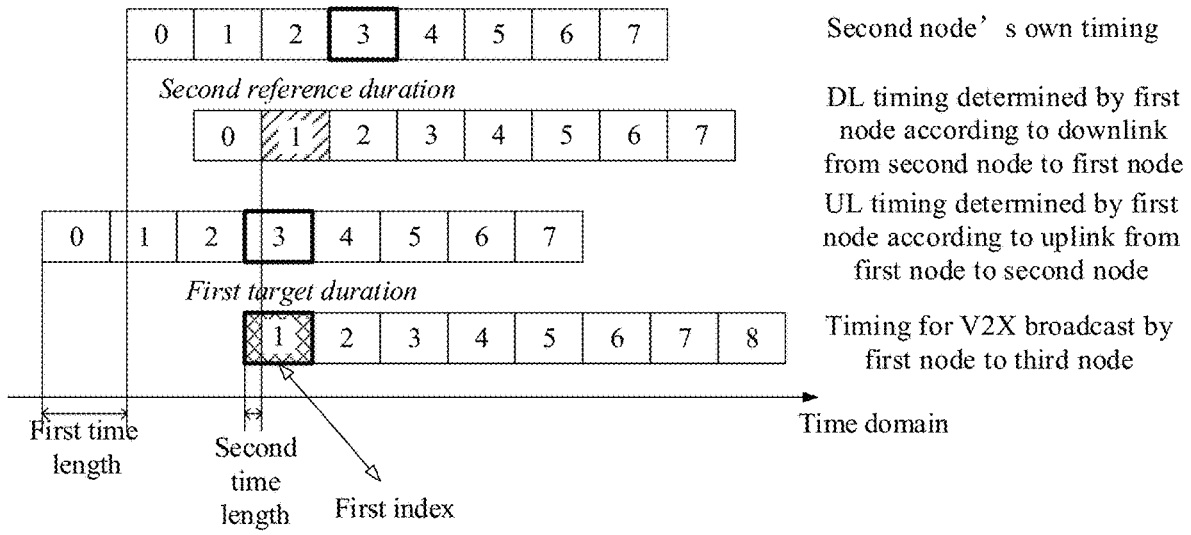
FIG. 9 illustrates a schematic diagram of a first target duration and a second reference duration according to another embodiment of the present disclosure.

Embodiment 9 illustrates another schematic diagram of a first target duration and a second reference duration, as shown in FIG. 9. In FIG. 9, the first row depicts a second node's own timing, the second row depicts a DL timing determined by a first node according to downlink from the second node to the first node, the third row depicts a UL timing determined by the first node according to uplink from the first node to the second node, and the fourth row depicts a timing for V2X broadcast by the first node to the third node; a second reference duration illustrated herein is a longer-lasting duration of two durations in a first time window that overlap with the first target duration; the slash-filled box represents the second reference duration, and the cross-filled box represents the first target duration; a second time length illustrated herein is equal to a time interval between a start of the second reference duration in time domain and a start of the first target duration in time domain, and an index of the first target duration in a timing for a V2X transmission between the first node and the third node is a first index in the present disclosure.

In one embodiment, a duration in FIG. 9 marked by 3 according to the second node's own timing is a duration in the first duration set in the present disclosure.

In one embodiment, a duration framed with thick solid lines in FIG. 9 corresponds to a duration of the first node for V2X transmissions.

In one embodiment, the first target duration is a sub-frame, and the first index is used to indicate a sub-frame sequence number of the first target duration in a second time window in the present disclosure.

In one embodiment, the first target duration is a slot, and the first index is used to indicate a slot sequence number of the first target duration in a second time window in the present disclosure.

In one embodiment, the first target duration belongs to a first radio frame, the first index comprises a first sub-index, and the first sub-index is used to indicate a radio frame sequence number of the first radio frame in the second time window in the present disclosure. In one embodiment, the first index is a non-negative integer.

Embodiment 10

Figure 10:
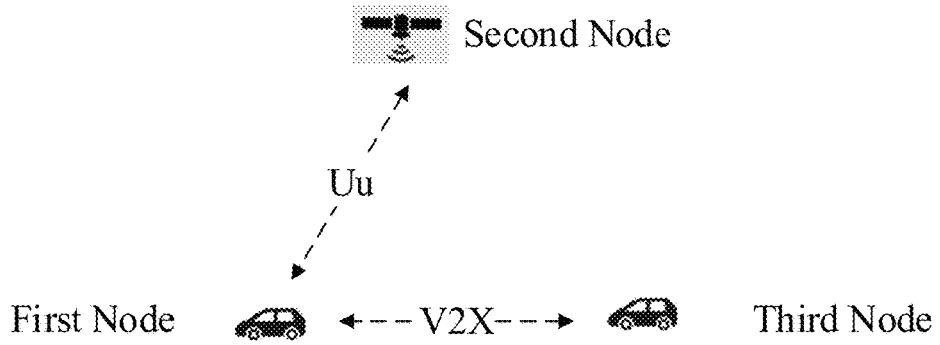
FIG. 10 illustrates a schematic diagram of an application scenario according to one embodiment of the present disclosure.

Embodiment 10 illustrates a schematic diagram of an application scenario, as shown in FIG. 10. In FIG. 10, an uplink transmission is performed via a Uu link between a first node and a second node illustrated herein, while the first node is in V2X communication with a third node; the second node manages to control V2X communications by allocating V2X time-frequency resources to terminal equipment within coverage.

In one embodiment, the terminal equipment within coverage comprises the first node.

In one embodiment, the terminal equipment within coverage comprises the third node.

In one embodiment, the third node is capable of receiving the third signaling, and the third signaling is used by the third node for determining the first time length.

In one embodiment, the third node determines a position of the first target duration according to the first time length.

In one embodiment, the first node transmits a synchronization signal used for V2X synchronization in the first target duration, and the third node performs blind detection on the synchronization signal for V2X synchronization in the first target duration.

Embodiment 11

Figure 11:
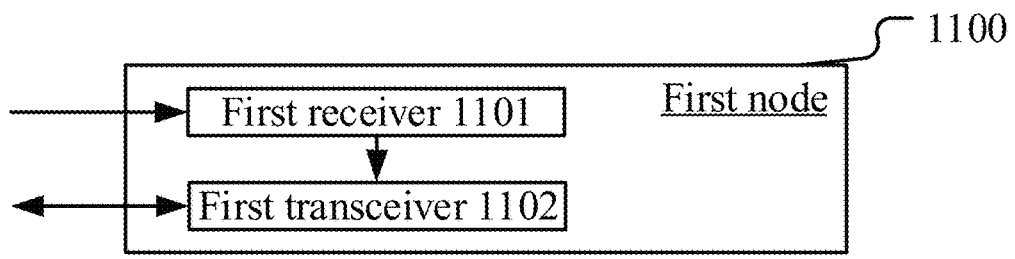
FIG. 11 illustrates a structure block diagram used in a first node according to one embodiment of the present disclosure.

Embodiment 11 illustrates a structure block diagram used in a first node, as shown in FIG. 11. In FIG. 11, a first node 1100 comprises a first receiver 1101 and a first transceiver 1102.

The first receiver 1101 receives a first signaling, a second signaling and a third signaling, of which the first signaling indicates a first duration set, and the second signaling indicates a first time window, any duration in the first duration set being a duration in the first time window, and a timing of each duration in the first time window referring to a receiving timing of the first node-side, and the third signaling indicates a first time length.

The first transceiver 1102 transmits a first signal in a first target duration according to a timing of the first target duration, the first target duration being deferred by a first time length is a first reference duration, and the first reference duration is a duration in a first duration set.

In Embodiment 11, the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the first transceiver 1102 transmits a second signal; the second signal comprises second information, the second information being used to determine a second time length; the second time length is dependent on a time interval between a start of the second reference duration in time domain and a start of the first target duration in time domain.

In one embodiment, the first transceiver 1102 transmits a target signal; the target signal indicates a second duration set out of a second time window, the first target duration is a duration in the second time window, and an index of the first target duration in the second time window is the first index.

In one embodiment, the first transceiver 1102 transmits a third signal and a fourth signal, and also receives a fifth signaling; both transmission of the third signal and of the fourth signal refer to a timing in the second duration set, and reception of the fifth signaling refers to the timing in the second duration set, the third signal comprises configuration information of the fourth signal, and the fifth signaling is used to determine whether the fourth signal is correctly received.

In one embodiment, the first receiver 1101 receives a synchronization signal; a start time of reception of the synchronization signal in the first node is a start time for a multicarrier symbol occupied by the synchronization signal in a duration to which the synchronization signal belongs.

In one embodiment, the first receiver 1101 comprises at least the first four of the antenna 452, the receiver 454, the multi-antenna receiving processor 458, the receiving processor 456 and the controller/processor 459 in Embodiment 4.

In one embodiment, the first transceiver 1102 comprises at least the first four of the antenna 452, the transmitter 454, the multi-antenna transmitting processor 457, the transmitting processor 468 and the controller/processor 459 in Embodiment 4.

Embodiment 12

Figure 12:
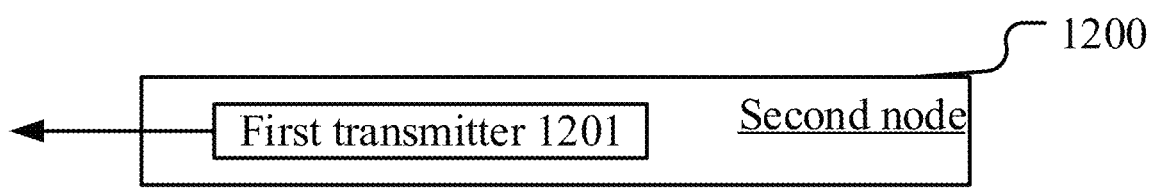
FIG. 12 illustrates a structure block diagram used in a second node according to one embodiment of the present disclosure.

Embodiment 12 illustrates a structure block diagram used in a second node, as shown in FIG. 12. In FIG. 12, a second node comprises a first transmitter 1201.

The first transmitter 1201 transmits a first signaling, a second signaling and a third signaling, of which the first signaling indicates a first duration set, and the second signaling indicates a first time window, any duration in the first duration set being a duration in the first time window, and a timing of each duration in the first time window refers to a receiving timing of the first node-side, and the third signaling indicates a first time length.

In Embodiment 12, one receiver of the first signaling includes the first node, the first node transmitting a first signal in a first target duration according to a timing of the first target duration, the first target duration being deferred by a first time length is a first reference duration, and the first reference duration is a duration in a first duration set; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the first transmitter 1201 transmits a synchronization signal; a start time of reception of the synchronization signal in the first node is a start time for a multicarrier symbol occupied by the synchronization signal in a duration to which the synchronization signal belongs.

In one embodiment, the first transmitter 1201 comprises at least the first four of the antenna 420, the transmitter 418, the multi-antenna transmitting processor 471, the transmitting processor 416 and the controller/processor 475 in Embodiment 4.

Embodiment 13

Figure 13:
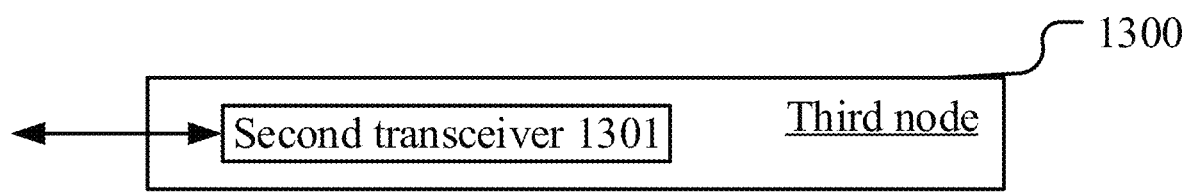
FIG. 13 illustrates a structure block diagram used in a third node according to one embodiment of the present disclosure.

Embodiment 13 illustrates a structure block diagram used in a third node, as shown in FIG. 13. In FIG. 13, a third node 1300 comprises a second transceiver 1301.

The second transceiver 1301 receives a first signal in a first target duration according to a timing of the first target duration, the first target duration being deferred by a first time length is a first reference duration, and the first reference duration is a duration in a first duration set.

In Embodiment 13, a transmitter of the first signal is a first node; the first node determines the first duration set by receiving a first signaling, and determines a first time window by receiving a second signaling, any duration in the first duration set being a duration in the first time window, and a timing of each duration in the first time window referring to a receiving timing of the first-node side, and the first node determines the first time length by receiving a third signaling; the first signal comprises first information, the first information indicates a first index, and the first index is as same as an index of a second reference duration in the first time window, the second reference duration and the first target duration are overlapping in time domain, while the first reference duration and the first target duration are non-overlapping in time domain; the second reference duration is a duration in the first time window.

In one embodiment, the second transceiver 1301 receives a second signal; the second signal comprises second information, the second information being used to determine a second time length; the second time length is dependent on a time interval between a start of the second reference duration in time domain and a start of the first target duration in time domain.

In one embodiment, the second transceiver 1301 receives a target signal; the target signal indicates a second duration set out of a second time window, the first target duration is a duration in the second time window, and an index of the first target duration in the second time window is the first index.

In one embodiment, the second transceiver 1301 receives a third signal and a fourth signal, and also transmits a fifth signaling; both transmission of the third signal and of the fourth signal refer to a timing in the second duration set, and reception of the fifth signaling refers to the timing in the second duration set, the third signal comprises configuration information of the fourth signal, and the fifth signaling is used to determine whether the fourth signal is correctly received.

In one embodiment, the second transceiver 1301 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving a first signaling, a second signaling and a third signaling, from a second node,
      wherein the first signaling indicates a first duration set, the second signaling indicates a first time window, any duration in the first duration set being a duration in the first time window, and a timing of each duration in the first time window referring to a receiving timing of the first node, and the third signaling indicates a first time length; and
   a first transceiver, transmitting a first signal, to a third node, in a first target duration according to a timing of the first target duration,
      wherein the first target duration being delayed in time domain by a first time length is a first reference duration, the first reference duration is a duration in a first duration set, and the first target duration and the first reference duration have a same time duration, and
      wherein the first signal comprises first information indicating a first index, which is the same as an index of a second reference duration in the first time window, the second reference duration and the first target duration are overlapping in time domain while the first reference duration and the first target duration are non-overlapping in time domain, and the second reference duration is a duration in the first time window.

2. The first node according to claim 1, wherein the first transceiver transmits a second signal, to the third node, comprising second information which is used to determine a second time length, wherein the second time length is dependent on a time interval between a start of the second reference duration in time domain and a start of the first target duration in time domain.

3. The first node according to claim 2, wherein the third node determines a receiving timing for a radio signal from the first node to the third node according to the first index, and the third node determines a transmitting timing for a radio signal from the third node to the first node according to the first index.

4. The first node according to claim 1, wherein the first transceiver transmits a target signal, to the third node, indicating a second duration set out of a second time window, the first target duration is a duration in the second time window, and an index of the first target duration in the second time window is the first index.

5. The first node according to claim 4, wherein the first transceiver transmits a third signal and a fourth signal, to the third node, and the first transceiver receives a fifth signaling, from the third node, wherein both transmission of the third signal and of the fourth signal is performed according to a timing in the second duration set, and reception of the fifth signaling is performed according to the timing in the second duration set, and wherein the third signal comprises configuration information of the fourth signal, and the fifth signaling is used to determine whether the fourth signal is correctly received.

6. The first node according to claim 5, wherein the transmission of both the third signal and the fourth signal performed according to a timing in the second duration set means that a boundary of a multicarrier symbol occupied by transmitting the third signal is aligned with a boundary of a multicarrier symbol in the second duration set and that a boundary of a multicarrier symbol occupied by transmitting the fourth signal is aligned with a boundary of a multicarrier symbol in the second duration set.

7. The first node according to claim 4, wherein durations in the second duration set correspond to durations in the first duration set respectively, and a time interval between any duration in the second duration set and a corresponding duration in the first duration set is the same as a time interval between the first target duration and the second reference duration.

8. The first node according to claim 4, wherein the first time window is determined according to a timing specific to a transmitter of the first signaling, while the second time window is a timing in sidelink determined according to a transmitting timing for the first node.

9. The first node according to claim 1, wherein the first receiver receives a synchronization signal, from the second node, wherein a start time of reception of the synchronization signal in the first node is a start time for a multicarrier symbol occupied by the synchronization signal in a duration to which the synchronization signal belongs.

10. The first node according to claim 1, wherein the first duration set is time-domain resources reserved for non-cellular link transmission according to a timing of the second node, wherein the non-cellular link comprises a sidelink, or a V2X traffic transmission link.

11. The first node according to claim 1, wherein the second signaling indicates a position of a duration occupied by the second signaling in the first time window, and wherein the duration occupied by the second signaling is a duration in the first time window.

12. The first node according to claim 1, wherein the first time length is dependent on a quantized value of a transmission delay from the first node to the second node.

13. The first node according to claim 1, wherein the first time length is dependent on at least one of a height of the second node or an inclination angle of the second node to the first node.

14. The first node according to claim 1, wherein the first index is a radio frame number and an index of the second reference duration in the first time window is a radio frame number, or the first index is a sub-frame number and an index of the second reference duration in the first time window is a sub-frame number, or the first index is a slot number and an index of the second reference duration in the first time window is a slot number.

15. A second node for wireless communications, comprising:
   a first transmitter, transmitting a first signaling, a second signaling and a third signaling, to a first node,
      wherein the first signaling indicates a first duration set, the second signaling indicates a first time window, any duration in the first duration set being a duration in the first time window, and a timing of each duration in the first time window refers to a receiving timing of the first node, and the third signaling indicates a first time length,
      wherein the first node transmits a first signal in a first target duration, to a third node, according to a timing of the first target duration,
      wherein the first target duration being delayed in time domain by a first time length is a first reference duration, the first reference duration is a duration in a first duration set, and the first target duration and the first reference duration have a same time duration, and wherein the first signal comprises first information indicating a first index which is the same as an index of a second reference duration in the first time window.

16. A method used in a first node for wireless communications, comprising:

receiving a first signaling, a second signaling and a third signaling, from a second node,
wherein the first signaling indicates a first duration set, the second signaling indicates a first time window, any duration in the first duration set being a duration in the first time window, and a timing of each duration in the first time window referring to a receiving timing of the first node, and the third signaling indicates a first time length; and transmitting a first signal, to a third node, in a first target duration according to a timing of the first target duration,
wherein the first target duration being delayed in time domain by a first time length is a first reference duration, the first reference duration is a duration in a first duration set, and the first target duration and the first reference duration have a same time duration, and
wherein the first signal comprises first information indicating a first index which is the same as an index of a second reference duration in the first time window, the second reference duration and the first target duration are overlapping in time domain while the first reference duration and the first target duration are non-overlapping in time domain, and the second reference duration is a duration in the first time window.

17. The method of the first node according to claim 16, comprising:

transmitting a second signal, to the third node, comprising second information which is used to determine a second time length,
wherein the second time length is dependent on a time interval between a start of the second reference duration in time domain and a start of the first target duration in time domain.

18. The method of the first node according to claim 16, comprising:

transmitting a target signal, to the third node,
wherein the target signal indicates a second duration set out of a second time window, the first target duration is a duration in the second time window, and an index of the first target duration in the second time window is the first index.

19. The method of the first node according to claim 18, comprising:

transmitting a third signal and a fourth signal to the third node; and
receiving a fifth signaling, from the third node,
wherein both transmission of the third signal and of the fourth signal is performed according to a timing in the second duration set, and reception of the fifth signaling is performed according to the timing in the second duration set, and wherein the third signal comprises configuration information of the fourth signal, and the fifth signaling is used to determine whether the fourth signal is correctly received.

20. The method of the first node according to claim 16, comprising:

receiving a synchronization signal, from the second node,
wherein a start time of reception of the synchronization signal in the first node is a start time for a multicarrier symbol occupied by the synchronization signal in a duration to which the synchronization signal belongs.

* * * * *